United States Patent Office 3,141,028
Patented July 14, 1964

3,141,028
16-OXYGENATED PREGNA-4,17(20)-[TRANS]DIEN-3-ONES AND INTERMEDIATES THERETO
Walter R. Benn, Deerfield, Ill., assignor to G. D. Searle & Co., Chicago, Ill., a corporation of Delaware
No Drawing. Filed Oct. 2, 1962, Ser. No. 227,707
10 Claims. (Cl. 260—397.4)

The present invention relates to novel steroidal compounds characterized by a 16-oxygenated function and also by a 17(20) point of unsaturation and, more particularly, to 3,16-bisoxygenated pregna[trans]dienes of the structural formula

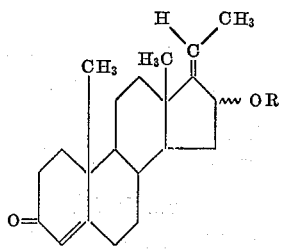

and

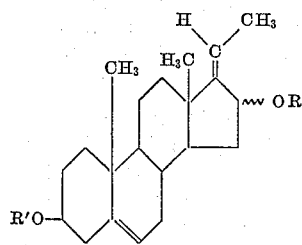

wherein R and R' are selected from the group consisting of hydrogen and lower alkanoyl radicals, and the wavy line indicates the alternative "α" or "β" configuration at carbon atom 16.

Examples of lower alkanoyl radicals encompassed by the foregoing R and R' terms are, typically, formyl, acetyl, propionyl, butyryl, valeryl, caproyl, and the branched-chain groups isomeric therewith.

A suitable group of starting materials utilizable in the manufacture of the compounds of the present invention is that represented by the structural formula

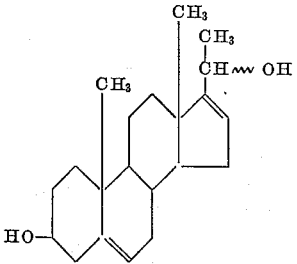

wherein the wavy line indicates the alternative "α" or "β" configuration at carbon atom 20. The reaction of these substances with a mixture of a lower alkanoic acid anhydride and a lower alkanoic acid in the presence of an acidic catalyst effects rearrangement of the double bond and the 20-hydroxy function to produce the corresponding pregna-5,17(20)-[trans]diene-3β,16-diol 3,16-di (lower alkanoates). Hydrolysis of these diesters with a suitable hydrolyzing reagent affords thte free diols, which are converted to the diformates, then submitted to the Oppenauer oxidation reaction to yield the 16-hydroxypregna-4,17(20)-[trans]dien-3-ones of the present invention. The 3,16-diformates can alternatively be obtained directly from the aforementioned 3,20-diol starting materials by reaction with formic acid in the presence of an alkaline catalyst such as triethylamine. As a specific example of these processes, pregna-5,16-diene-3β,20β-diol is allowed to react with acetic anhydride in acetic acid in the presence of p-toluene-sulfonic acid mnohydrate to afford a mixture of pregna-5,17(20)-[trans]diene-3β,16β-diol 3,16 diacetate and the epimeric 3β,16α-diol 3,16-diacetate. Chromatographic separation affords the individual pure epimers which can be hydrolyzed with potassium hydroxide to yield the corresponding free 3βα,16α-diol and 3β,16β-diol. Reaction of the latter 3β,16β-diol, for example, with formic acid and triethylamine results in the corresponding 3,16-diformate, and the latter diester is contacted in toluene with aluminum isopropoxide and cyclohexanone to yield 16β-hydroxypregna-4,17(20)-[trans]dien-3-one.

An alternate process leading to the pregna-4,17(20)-[trans]dien-3-ones of the present invention utilizes pregna-5,16-diene-3,20-dione 3-ethylene ketal as the starting materal. Reduction of that substance produces the epimeric 20-hydroxy derivatives, which can be converted to the corresponding 20-(lower alkanoates) by reaction with a lower alkanoic acid anhydride. The reaction of either the 20-ol or the corresponding 20-(lower alkanoate) with a lower alkanoic acid anhydride and lower alkanoic acid in the presence of an acidic catalyst by an analogous procedure to that described above produces the 16-(lower alkanoyl)oxypregna-4,17(20)-[trans]dien-3-ones of this invention. These esters can be hydrolyzed to produce the corresponding 16-ols. The processes involved are specifically illustrated by the reaction of the aforementioned pregna-5,16-diene-3,20-dione 3-ethylene ketal with lithium aluminum hydride in a tetrahydrofuran-ether solvent mixture to yield 20α-hydroxypregna-5,16-dien-3-one 3-ethylene ketal. Acylation with acetic anhydride in pyridine followed by reaction of the resulting 20-acetate with acetic anhydride in acetic acid together with a catalytic quantity of p-toluenesulfonic acid affords 16β - acetoxypregna-4,17(20)-[trans]dien-3-one and the corresponding 16α-acetoxy isomer, which are separated chromatographically. Hydrolysis in aqueous methanol with potassium hydroxide of each of these epimers affords 16β-hydroxypregna-4,17(20)-[trans]dien-3-one and 16α-hydroxypregna-4,17(20)-[trans]dien-3-one, respectively.

The pregna-4,17(20)-dien-3-ones of this invention are useful as antibiotic agents, as is evidenced by their ability to inhibit the growth of such organisms as *Diplococcus pneumoniae*. The corresponding pregna-5,17(20)-dien-3β-ols together with the 3-(lower alkanoate) esters thereof possess utility as intermediates to the latter antibiotic compounds.

The invention will appear more fully from the examples which follow. These examples are set forth by way of illustration only and it will be understood that the invention is not to be construed as limited in spirit or in scope by the details contained therein as many modifications in materials and methods will be apparent from this disclosure to those skilled in the art. In these examples, temperatures are given in degrees centigrade (° C.). Quantities of materials are expressed in parts by weight unless otherwise noted.

*Example 1*

To a cooled solution of 20 parts of pregna-5,16-diene-3,20-dione 3-ethylene ketal in 1750 parts of ether and 133 parts of tetrahydrofuran is added portionwise, with stirring, 20 parts of lithium aluminum hydride, and this reaction mixture is heated at the reflux temperature for about 6 hours, then is allowed to stand at room temperature for about 16 hours. To the cooled reaction mixture is then added successively 22.5 parts of ethyl acetate and 250 parts by volume of 10% aqueous potassium hydroxide, and stirring is continued for about 15 minutes. The organic layer is decanted from the precipitated solids and is dried over anhydrous sodium sulfate, then is evaporated to dryness at reduced pressure. The resulting crystalline residue is recrystallized first from acetone containing a small quantity of pyridine, then from methylcyclohexane containing a small quantity of pyridine to produce 20α-hydroxypregna-5,16-dien-3-one 3-ethylene ketal, melting at about 193–195° and characterized also by an optical rotation of —58.5° in chloroform.

Additional crystalline material obtained from the acetone recrystallization is dissolved in benzene and adsorbed on a magnesium silicate chromatographic column. This column is eluted with mixtures of ether and benzene containing increasing proportions of ether. The 5–10% ether in benzene eluates are evaporated to dryness, and the residual solid is recrystallized from methylcyclohexane containing a small quantity of pyridine to afford pure 20β-hydroxypregna-5,16-dien-3-one 3-ethylene ketal, melting at about 180–182° and displaying an optical rotation of —52.7° in chloroform.

Example 2

A mixture of 10 parts of 20α-hydroxypregna-5,16-dien-3-one 3-ethylene ketal, 100 parts of pyridine, and 20 parts of acetic anhydride is kept at room temperature for about 16 hours, then is poured into about 500 parts of warm water. The resulting aqueous mixture is stirred for about 30 minutes, and the resulting precipitate is collected by filtration, dried, and recrystallized from methylcyclohexane containing a small quantity of pyridine to produce pure 20α-acetoxypregna-5,16-dien-3-one 3-ethylene ketal, melting at about 170–171° and further characterized by an optical rotation of —75° in chloroform.

Example 3

The substitution of 10 parts of 20β-hydroxypregna-5,16-dien-3-one 3-ethylene ketal in the procedure of Example 2 results in 20β-acetoxypregna-5,16-dien-3-one 3-ethylene ketal, M.P. about 148.5–150°; [α]$_D$=—11° (chloroform).

Example 4

To a solution of 5 parts of 20α-acetoxypregna-5,16-dien-3-one 3-ethylene ketal in 105 parts of acetic acid containing 15 parts of acetic anhydride is added 0.25 part of p-toluenesulfonic acid monohydrate, and this reaction mixture is stored at room temperature for about 60 hours, then is poured into about 500 parts of warm water. The resulting aqueous solution is extracted with benzene, and the organic layer is separated, washed with aqueous sodium carbonate, dried over anhydrous sodium sulfate, and concentrated to dryness at reduced pressure. The residue is adsorbed on an alumina chromatographic column, and the column is eluted with benzene and ethyl acetate containing increasing proportions of ethyl acetate. The 0.5–1% ethyl acetate in benzene eluates are combined and stripped of solvent to afford a residue which is crystallized from aqueous methanol, resulting in pure 16α-acetoxypregna-4,17(20)-[trans]dien-3-one, melting at about 133–134° and displaying an optical rotation of +5° in chloroform. This substance is represented by the structural formula

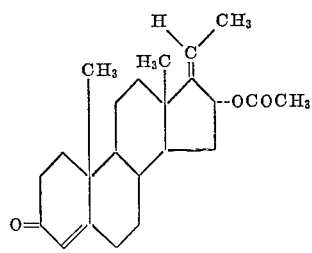

Further elution of the chromatographic column with 1.5–3% ethyl acetate in benzene and recrystallization of the resulting fractions from aqueous methanol affords pure 16β-acetoxypregna-4,17(20)-[trans]dien-3-one, melting at about 157–159.5° and displaying an optical rotation of +114° in chloroform. This substance is represented by the structural formula

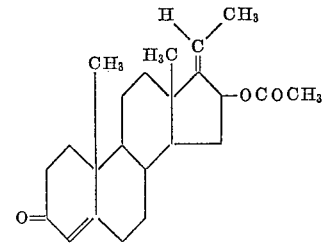

Example 5

The substitution of 5 parts of 20β-acetoxypregna-5,16-dien-3-one 3-ethylene ketal in the procedure of Example 4 results in a crude product which is purified by the procedure described in Example 4 to afford 16α-acetoxypregna-4,17(20)-[trans]dien-3-one and 16β-acetoxypregna-4,17-(20)-[trans]dien-3-one, identical with the products of that example.

Example 6

The substitution of 5 parts of 20α-hydroxypregna-5,16-dien-3-one 3-ethylene ketal in the procedure of Example 4 results in 16α-acetoxypregna-4,17(20)-[trans]dien-3-one and 16β-acetoxypregna-4,17(20)-[trans]dien-3-one, identical with the products of that example.

Example 7

The substitution of 5 parts of 20β-hydroxy-pregna-5,16-dien-3-one 3-ethylene ketal in the procedure of Example 4 results in 16α - acetoxypregna - 4,17(20)-[trans]dien-3-one and 16β - acetoxypregna - 4,17(20)-[trans]dien-3-one, identical with the products of that example.

Example 8

The reaction of 5 parts of 20α-hydroxypregna-5,16-dien-3-one 3-ethylene ketal with 129.5 parts of propionic acid, 19.1 parts of propionic anhydride, and 0.25 part of p-toluenesulfonic acid monohydrate according to the procedure of Example 4 affords 16α-propionoxypregna-4,17(20)-[trans]dien-3-one of the structural formula

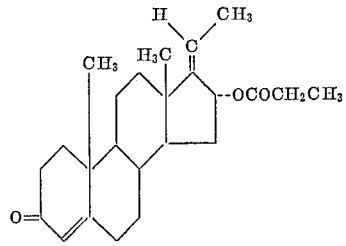

and 16β-propionoxypregna-4,17(20)-[trans]dien-3-one of the structural formula

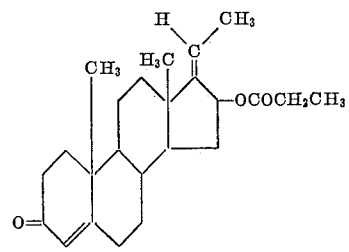

Example 9

The reaction of 5 parts of 20β-hydroxypregna-5,16-dien-3-one 3-ethylene ketal with 129.5 parts of propionic acid, 19.1 parts of propionic anhydride, and 0.25 part of p-toluenesulfonic acid monohydrate by the procedure described in Example 4 results in 16α-propionoxypregna-4,17(20)-[trans]dien-3-one and 16β-propionoxypregna-4,17(20)-[trans]dien-3-one, identical with the products of Example 8.

*Example 10*

A mixture of 3 parts of 16β-acetoxypregna-4,17(20)-[trans]dien-3-one and 100 parts by volume of 5% methanolic potassium hydroxide is heated at the reflux temperature, under nitrogen, for about 1½ hours, then is poured into 300 parts of water. The resulting precipitated solids are collected by filtration, dried and recrystallized from ether-hexane to yield 16β-hydroxypregna-4,17(20)-[trans]dien-3-one, melting at about 172–175° and displaying an optical rotation of +141.5° in chloroform. It is represented by the structural formula

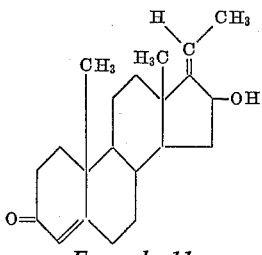

*Example 11*

The substitution of 3 parts of 16α-acetoxypregna-4,17(20)-[trans]dien-3-one in the procedure of Example 10 affords 16α-hydroxypregna-4,17(20)-[trans]dien-3-one, M.P. about 173.5–175.5°; [α]$_D$=+104.5° (chloroform). This compound is represented by the structural formula

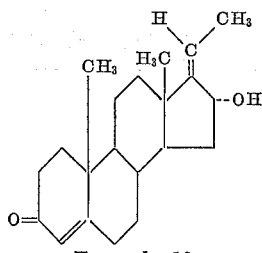

*Example 12*

A mixture of 10 parts of pregna-5,16-diene-3β,20β-diol, 210 parts of acetic acid, 30 parts of acetic anhydride, and 0.5 part of p-toluenesulfonic acid monohydrate is allowed to react at room temperature for about 48 hours, then is poured into about 1,000 parts of warm water, and the resulting aqueous mixture is extracted with benzene. The benzene layer is separated, washed with aqueous sodium carbonate, dried over anhydrous sodium sulphate, and concentrated to a small volume at reduced pressure. The residual material is adsorbed on an alumina chromatographic column, and the column is eluted with mixtures of ether and benzene. The 0.5–1.5% ether in benzene eluates are concentrated at reduced pressure, and the resulting material is crystallized from methanol to yield pure pregna-5,17(20)-[trans]diene-3β,16α-diol 3,16-diacetate, melting at about 149–151.5° and characterized also by an optical rotation of —116° in chloroform. It is represented by the structural formula

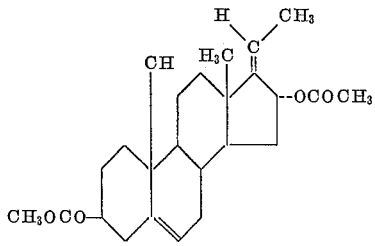

Further elution of the chromatographic column with 1.5–2% ether in benzene followed by recrystallization from methanol of the resulting fractions yields pure pregna-5,17(20)-[trans]diene-3β,16β-diol 3,16-diacetate, melting at about 175–177° and characterized further by an optical rotation of —17° in chloroform. It is represented by the structural formula

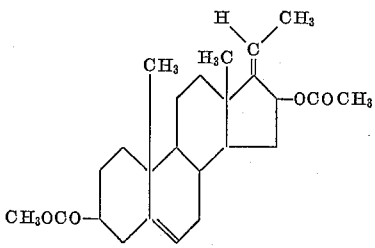

*Example 13*

The substitution of 10 parts of pregna-5,16-diene-3β,20α-diol in the procedure described in Example 12 results in pregna-5,17(20)-[trans]diene-3β,16β-diol 3,16-diacetate and pregna-5,17(20)-[trans]diene-3β,16α-diol 3,16-diacetate, identical with the products of that example.

*Example 14*

The substitution of 259 parts of propionic acid and 38.2 parts of propionic anhydride in the procedure of Example 12 affords pregna-5,17(20)-[trans]diene-3β,16α-diol 3,16-dipropionate of the structural formula

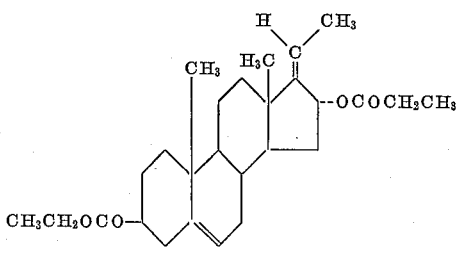

and pregna-5,17(20)-[trans]diene-3β,16β-diol 3,16-dipropionate of the structural formula

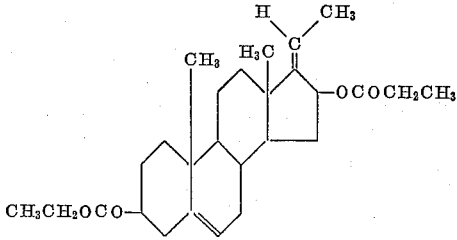

*Example 15*

The reaction of 10 parts of pregna-5,16-diene-3β,20α-diol, 259 parts of propionic acid, and 38.2 parts of propionic anhydride by the procedure of Example 12 results in pregna-5,17(20)-[trans]diene-3β,16α-diol 3,16-dipropionate and pregna-5,17(20)-[trans]diene-3β,16β-diol 3,16-dipropionate, identical with the products of Example 14.

*Example 16*

The hydrolysis of pregna-5,17(20)-[trans]diene-3β,16β-diol 3,16-diacetate by the procedure described in Example 10 affords pregna-5,17(20)-[trans]diene-3β,16β-diol, melting at about 187–192° and characterized further by an optical rotation of —31° in chloroform. This substance is represented by the structural formula.

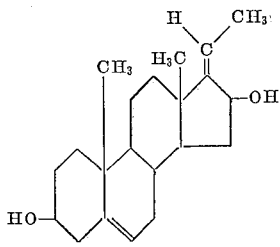

Example 17

By substituting 3 parts of pregna-5,17(20)-[trans]diene-3β,16α-diol 3,16-diacetate and otherwise proceeding according to the processes described in Example 10, pregna-5,17(20)-[trans]diene-3β,16α-diol, melting at about 219–223° and displaying an optical rotation of —73° in chloroform, is obtained. It is characterized also by the structural formula

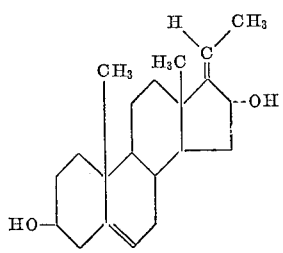

Example 18

To 11 parts of a mixture containing equal quantities of pregna-5,16-diene-3β,20α-diol and pregna-5,16-diene-3β,20β-diol is added 32.9 parts of triethylamine and 244 parts of 98% formic acid, and this reaction mixture is stored at room temperature for about 24 hours, then is poured into about 2000 parts of water. Extraction with benzene affords an organic solution which is washed successively with aqueous sodium carbonate, water, and saturated aqueous sodium chloride. Distillation of the solvent at reduced pressure affords a mixture of the 3β, 16-diformates, characterized by infrared absorption maxima at about 5.78, 6.21, and 8.1–8.4 microns.

To a solution of 12.6 parts of the latter mixed diformates in 870 parts of toluene containing 114 parts of cyclohexanone is added 12 parts of aluminum isopropoxide and the resulting reaction mixture is distilled slowly over a period of about 2 hours. To the cooled reaction mixture is then added 500 parts by volume of saturated aqueous sodium potassium tartrate, and the organic solvents are removed by steam distillation. The residual aqueous mixture is extracted with ether, and the ether layer is separated, washed with saturated aqueous sodium chloride, dried over anhydrous sodium sulfate, and concentrated at reduced pressure to afford a light amber oil. A solution of this oily material in benzene is adsorbed on an alumina chromatographic column, and the column is eluted with ether-benzene and ether-ethyl acetate mixtures. The 30% ethyl acetate in ether eluate is evaporated to dryness, and the residue is crystallized from ether-hexane to yield 16β-hydroxy-pregna-4,17(20)-[trans]dien-3-one, melting at about 172–175° and identical with the product of Example 10.

Further elution of the chromatographic column with 50% ethyl acetate in ether affords a fraction which is crystallized from ether-hexane to yield 16α-hydroxy-pregna-4,17(20)-[trans]dien-3-one, melting at about 173–175° and identical with the product of Example 11.

Example 19

The substitution of 11 parts of a mixture of pregna-5,17(20)-[trans]diene-3β,16α-diol and pregna-5,17(20)-[trans]diene-3β,16β-diol in the procedure of Example 18 results in 16β-hydroxypregna-4,17(20)-[trans]dien-3-one and 16α-hydroxypregna-4,17(20)-[trans]dien-3-one, identical with the products of that example.

What is claimed is:
1. A compound of the structural formula

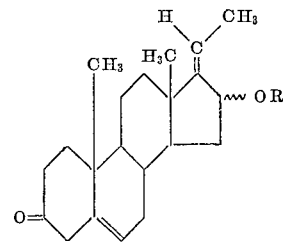

wherein R is selected from the group consisting of hydrogen and lower alkanoyl radicals.
2. 16α-hydroxypregna-4,17(20)-[trans]dien-3-one.
3. 16β-hydroxypregna-4,17(20)-[trans]dien-3-one.
4. 16β-acetoxypregna-4,17(20)-[trans]dien-3-one.
5. 16α-acetoxypregna-4,17(20)-[trans]dien-3-one.
6. A compound of the structural formula

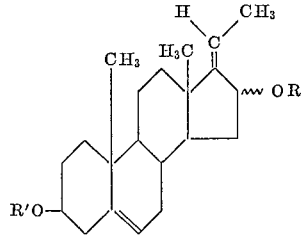

wherein R and R' are selected from the group consisting of hydrogen and lower alkanoyl radicals.
7. Pregna-5,17(20)-[trans]diene-3β,16α-diol 3,16-diacetate.
8. Pregna-5,17(20)-[trans]diene-3β,16β-diol 3,16-diacetate.
9. Pregna-5,17(20)-[trans]diene-3β,16α-diol.
10. Pregna-5,17(20)-[trans]diene-3β,16β-diol.

No references cited.

UNITED STATES PATENT OFFICE
CERTIFICATE OF CORRECTION

Patent No. 3,141,028                  July 14, 1964

Walter R. Benn

It is hereby certified that error appears in the above numbered patent requiring correction and that the said Letters Patent should read as corrected below.

Column 2, line 11, for "3βα,16α-diol" read -- 3β,16α-diol --; column 8, lines 22 to 32, the formula should appear as shown below instead of as in the patent:

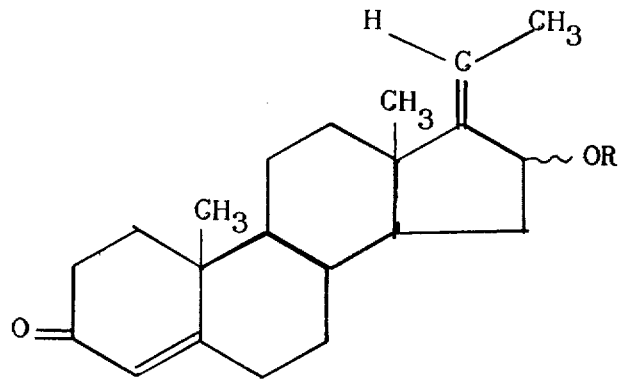

Signed and sealed this 17th day of November 1964.

(SEAL)
Attest:

ERNEST W. SWIDER                  EDWARD J. BRENNER
Attesting Officer                  Commissioner of Patents